(12) United States Patent
Park et al.

(10) Patent No.: US 8,976,013 B2
(45) Date of Patent: Mar. 10, 2015

(54) CONTACT TYPE TACTILE FEEDBACK APPARATUS AND OPERATING METHOD OF CONTACT TYPE TACTILE FEEDBACK APPARATUS

(71) Applicants: Samsung Electronics Co., Ltd., Suwon-si, Gyeonggi-do (KR); Industry-University Cooperation Foundation Sogang University, Seoul (KR)

(72) Inventors: Joonah Park, Hwaseong-si (KR); Hyung Kew Lee, Gunpo-si (KR); Eun Hyup Doh, Incheon (KR); Kwang Seok Yun, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 45 days.

(21) Appl. No.: 13/770,100

(22) Filed: Feb. 19, 2013

(65) Prior Publication Data
US 2013/0265147 A1    Oct. 10, 2013

(30) Foreign Application Priority Data
Apr. 4, 2012    (KR) .................. 10-2012-0034853

(51) Int. Cl.
*H04B 3/36* (2006.01)
*G08B 6/00* (2006.01)
*G06F 3/01* (2006.01)

(52) U.S. Cl.
CPC . *G08B 6/00* (2013.01); *G06F 3/016* (2013.01)
USPC .............. 340/407.1; 340/825.19; 340/538.16

(58) Field of Classification Search
USPC ............. 340/407.1, 407.2, 540, 825.19, 965, 340/691.2, 538.16, 530, 428–429, 545.4, 340/562, 525, 514–515, 535
See application file for complete search history.

(56) References Cited

U.S. PATENT DOCUMENTS

| | | | |
|---|---|---|---|
| 6,445,284 B1 * | 9/2002 | Cruz-Hernandez et al. | 340/407.1 |
| 8,174,372 B2 * | 5/2012 | da Costa | 340/407.2 |
| 8,570,163 B2 * | 10/2013 | Makinen et al. | 340/407.2 |
| 2009/0303022 A1 * | 12/2009 | Griffin et al. | 340/407.2 |
| 2010/0046994 A1 * | 2/2010 | Kikuchi et al. | 399/320 |
| 2010/0321330 A1 * | 12/2010 | Lim et al. | 345/174 |

FOREIGN PATENT DOCUMENTS

| | | |
|---|---|---|
| JP | 5-232859 | 9/1993 |
| JP | 2003-316493 | 11/2003 |
| JP | 2003-337653 | 11/2003 |
| JP | 2005-293512 | * 5/2004 |
| JP | 2005-293512 | 10/2005 |
| JP | 2009-276996 | 11/2009 |
| JP | 2011-67609 | 4/2011 |
| KR | 1994-7000703 | 2/1994 |
| KR | 10-2010-0091382 | 8/2010 |

* cited by examiner

*Primary Examiner* — Daniel Previl
(74) *Attorney, Agent, or Firm* — NSIP Law

(57) ABSTRACT

A contact type tactile feedback apparatus and operational method of the contact type tactile feedback apparatus is provided. The contact type tactile feedback apparatus may enable an object to be in close contact with a power feedback portion to transfer a power sensed by a sensor, using a fixing portion, thereby enabling the object to recognize the power, intuitively.

19 Claims, 11 Drawing Sheets

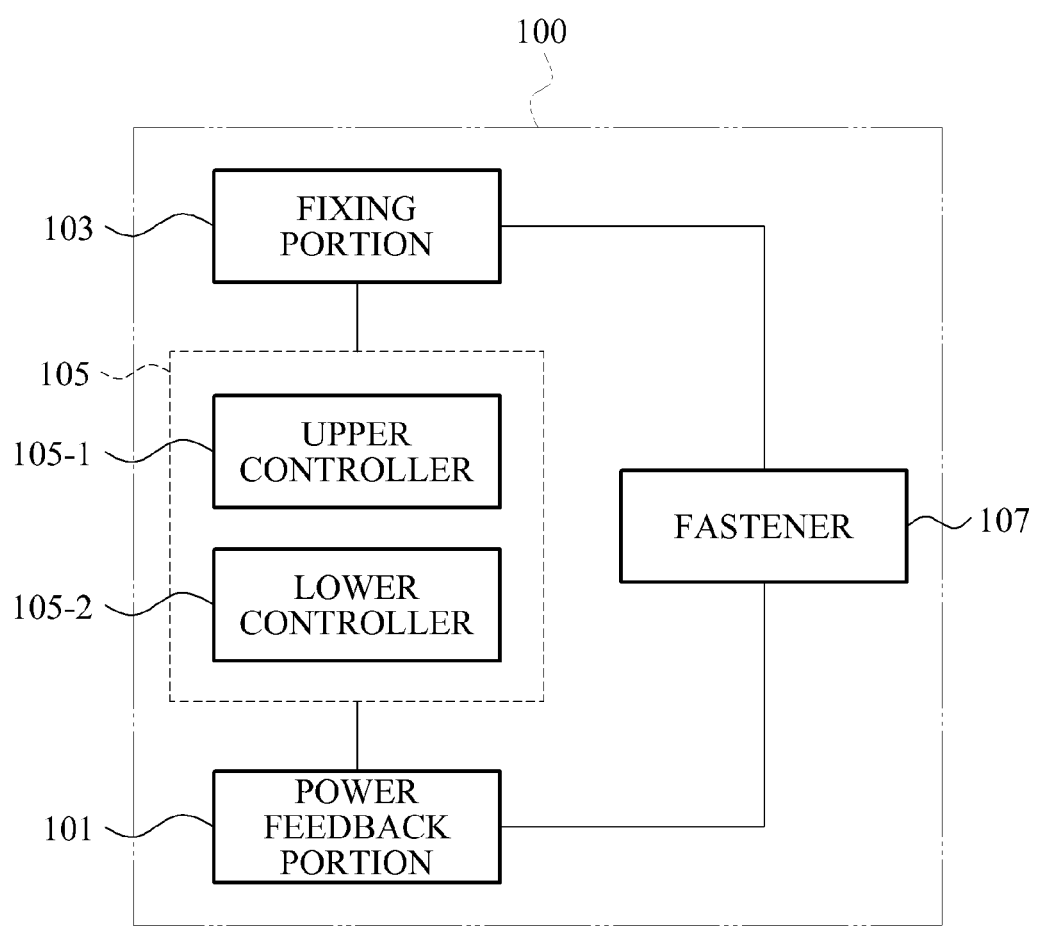

+Y    -Y 811   805-2

805-4   813

CONTACT TYPE TACTILE FEEDBACK APPARATUS AND OPERATING METHOD OF CONTACT TYPE TACTILE FEEDBACK APPARATUS

CROSS-REFERENCE TO RELATED APPLICATIONS

This application claims the priority benefit of Korean Patent Application No. 10-2012-0034853, filed on Apr. 4, 2012, in the Korean Intellectual Property Office, the disclosure of which is incorporated herein by reference.

BACKGROUND

1. Field

One or more example embodiments relate to a technology for transferring a sensed power to an object, for example, a finger of a user, by expressing the sensed power as a physical movement.

2. Description of the Related Art

Research on a haptic feedback is actively being performed, as a technology for feeling power, that is, a tactile sense. The term "haptic feedback" refers to artificially generating and transferring a sense that is felt when actually controlling an object with a hand or arm of a human in order to intuitively control, for example, an object in a virtual space or a robot at a remote distance. As an example, a haptic feedback apparatus may provide feedback in a manner of adjusting a level of a load that is felt while controlling a device, when a human controls an object in a virtual space or a robot at a distance using a specially designed device, for example, a control stick.

Since a relatively significant portion of a tactile sense is distributed in a finger, among other body parts, a user controls an object with a finger in a sophisticated manner, and easily recognizes a power required to control the object. Accordingly, in order to control an object in a sophisticated manner, using a robot, there is a desire for a technology that transfers, to a finger of a user, power applied to a finger of the robot or power applied to the object by the robot, and enables the user to recognize the power intuitively, thereby controlling power used to control the robot, in a sophisticated manner, based on the recognized power.

SUMMARY

The foregoing and/or other aspects are achieved by providing a contact type tactile feedback apparatus, including a power feedback portion that may be moved in at least one direction based on a sensed signal generated by a sensor, and a fixing portion to adjust a gap between the power feedback portion and the fixing portion such that an object may be in close contact with the power feedback portion.

The power feedback portion may include a first power feedback portion including n first actuators to support, from a lower portion, a first contact portion that may be in contact with an upper surface of the object, and a second power feedback portion to receive the first power feedback portion, the second power feedback portion including m second actuators to move the first power feedback portion, in different directions, from a side of the first power feedback portion. Here, n and m denote natural numbers.

The power feedback portion may further include a lower controller to determine a support height at which the first contact portion may be supported by the n first actuators, based on a first sensed signal generated by the sensor, and to determine a movement distance by which the first power feedback portion may be moved by the m second actuators, based on a second sensed signal generated by the sensor.

The first power feedback portion may be moved in a Z-axial direction, that is, upwards and downwards, based on a support height at which the n first actuators may support the first contact portion, and the second power feedback portion may move the first power feedback portion in an X-axial direction or a Y-axial direction, that is, leftwards and rightwards, based on a movement distance by which the m second actuators may move the first power feedback portion.

The fixing portion may include p pressing actuators to press, in a lower direction, a second contact portion that may be in contact with an upper surface of the object. Here, p denotes a natural number.

The fixing portion may further include an upper controller to determine a press depth to which the second contact portion may be pressed by the p pressing actuators, based on the adjusted gap.

The apparatus may further include a fastener to fasten the power feedback portion and the fixing portion while maintaining the adjusted gap.

The foregoing and/or other aspects are achieved by providing an operating method of a contact type tactile feedback apparatus, the method including, when an object is in contact with a power feedback portion, adjusting a gap between the power feedback portion and a fixing portion such that the object may be in close contact with the power feedback portion, and moving the power feedback portion in at least one direction, based on a sensed signal generated by a sensor.

The foregoing and/or other aspects are achieved by providing a contact type tactile feedback apparatus including a power feedback unit that is pneumatically moved in a first direction based on a sensed signal generated by a sensor, and a fixing unit disposed on an upper portion of the power feedback unit to pneumatically adjust a gap between the power feedback portion and the fixing portion such that an object is in close contact with the power feedback portion.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 1 illustrates a configuration of a contact type tactile feedback apparatus according to example embodiments;

DETAILED DESCRIPTION

Figure 2A:
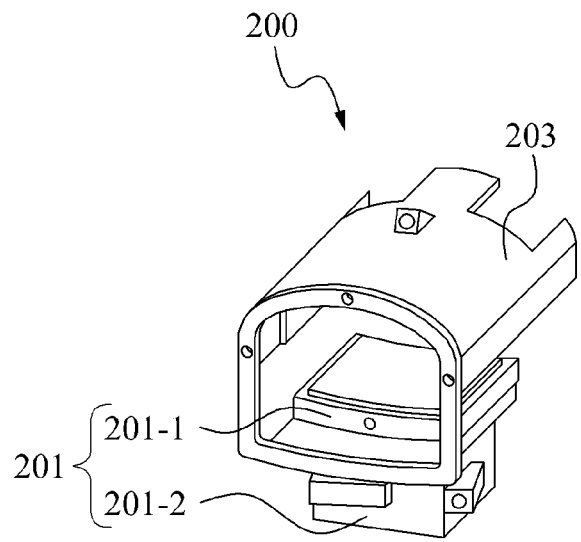
FIGS. 2A and 2B illustrate an example of a contact type tactile feedback apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of a contact type tactile feedback apparatus 100 according to example embodiments.

Referring to FIG. 1, the apparatus may include, for example, a power feedback portion 101, a fixing portion 103, a controller 105, and a fastener 107.

The power feedback portion 101 may be moved in at least one direction based on a sensed signal generated by a sensor (not shown), to express a power sensed by the sensor as a three-dimensional (3D) physical movement, thereby transferring the power to an object, for example a finger of a user, in contact with the power feedback portion 101. Here, the power feedback portion 101 may include a first power feedback portion (not shown) associated with a power in a vertical direction, and a second power feedback portion (not shown) associated with a power in a horizontal direction.

The first power feedback portion may include n first actuators (not shown) to support, from a lower portion, a first contact portion (not shown) that is in contact with an upper surface of the object. Here, n denotes a natural number. The first power feedback portion may be moved in a vertical direction, for example, a Z-axial direction, based on a support height of the first contact portion that is determined by a lower controller 105-2. Here, the first contact portion may be formed of, for example, an elastic member. The first contact portion may be moved, for example, in terms of a change in height, upon an inflow of air into a pneumatic chamber (not shown) included in a first actuator or an outflow of air from the pneumatic chamber, thereby enabling the support height to be adjusted by the first actuator, and transferring the power to the object in the vertical direction.

That is, the first power feedback portion may enable inflation of the first contact portion by increasing an amount of air to be provided to the first contact portion by the first actuator, and may be moved in an upper direction, that is, a positive (+) Z-axial direction, thereby transferring the power to the object in an upward vertical direction. Conversely, the first power feedback portion may control an inflation level of the first contact portion to be relatively low by decreasing the amount of air to be provided to the first contact portion by the first actuator, and may be moved in a lower direction, that is, a negative (−) Z-axial direction, thereby transferring the power to the object in a downward vertical direction.

The second power feedback portion may receive the first power feedback portion, and may include m second actuators (not shown) to move the first power feedback portion, in different directions, from a side of the first power feedback portion. Here, m denotes a natural number. The second power feedback portion may move the first power feedback portion in a horizontal direction, for example, an X-axial direction or a Y-axial direction, based on a movement distance of the first power feedback portion that is determined by the lower controller 105-2, thereby transferring the power to the object in a horizontal direction, through the first contact portion of the first power feedback portion.

For example, although not shown in FIG. 1, the second power feedback portion may include four second actuators, for example, a second actuator_#1, a second actuator_#2, a second actuator_#3, and a second actuator_#4, that are disposed in pairs to face one another. When air is injected into a pneumatic chamber included in the second actuator_#1 of two actuators disposed on an X-axial line, that is, the second actuator_#1 and the second actuator_#3, the second power feedback portion may move the first power feedback portion in an opposite direction of the second actuator_#1, thereby transferring the power to the object in a horizontal direction, that is, a +X-axial direction or a −X-axial direction. When air is injected into a pneumatic chamber included in the second actuator_#2 of the other two actuators disposed on a Y-axial line, that is, the second actuator_#2 and the second actuator_#4, the second power feedback portion may move the first power feedback portion in an opposite direction of the second actuator_#2, thereby transferring the power to the object in a horizontal direction, that is, a +Y-axial direction or a −Y-axial direction.

Here, the first actuator and the second actuator may correspond to, for example, pneumatic balloon actuators, and may adjust the support height of the first contact portion and the movement distance of the first power feedback portion, respectively, using an air pressure determined based on an amount of air.

The fixing portion 103 may adjust a gap between the power feedback portion 101 and the fixing portion 103 such that the object may be in close contact with the power feedback portion 101. For example, in an embodiment the fixing portion 103 may adjust a gap between the power feedback portion 101 and the fixing portion 103 such that the power feedback portion 101 applies pressure to the object. The degree of pressure may vary depending on adjusting of the gap between power feedback portion 101 and the fixing portion 103. In this instance, the fixing portion may adjust the gap between the power feedback portion 101 and the fixing portion 103 in proportion to an input signal, such that the object may be in close contact with the power feedback portion 101. That is, the fixing portion 103 may be disposed to be close to or separated from the power feedback portion 101 in proportion to the input signal that is generated by a generator (not shown), to adjust the gap between the power feedback portion 101 and fixing portion 103, thereby enabling the object to be in close contact with the power feedback portion 101, irrespective of a thickness of the object. Here, the input signal may refer to a signal to determine the gap between the power feedback portion 101 and the fixing portion 103, in proportion to the thickness of the object in contact with the power feedback portion 101.

The fixing portion 103 may include p pressing actuators to press, in a lower direction, a second contact portion that may be in contact with an upper surface of the object. Here, p denotes a natural number.

Here, the second contact portion may be formed of, for example, an elastic member. The second contact portion may be moved in response to an inflow of air into a pneumatic chamber included in a pressing actuator or an outflow of air from the pneumatic chamber, thereby enabling a press depth to be adjusted by the pressing actuator, and enabling the gap between the power feedback portion 101 and the fixing portion 103 to be adjusted.

The pressing actuator may correspond to, for example, a pneumatic balloon actuator, and may adjust the press depth of the second contact portion, using an air pressure determined based on an amount of air.

That is, the fixing portion 103 may move the second contact portion in a vertical direction, that is, the Z-axial direction, through the p pressing actuators, based on the press depth determined by an upper controller 105-1, thereby adjusting the gap between the power feedback portion 101 and the fixing portion 103.

For example, when a relatively great press depth is determined by the upper controller 105-1, the fixing portion 103 may enable the second contact portion to inflate by increasing an amount of air to be provided to the second contact portion by the pressing actuator, and may move the second contact portion in a lower direction, that is, a −Z-axial direction, thereby relatively narrowing the gap between the power feedback portion 101 and the fixing portion 103. Conversely, when a relatively shallow press depth is determined by the upper controller 105-1, the fixing portion 103 may enable a level of the inflation of the second contact portion to be relatively low by decreasing the amount of air to be provided to the second contact portion by the pressing actuator, and may move the second contact portion in an upper direction, that is, a +Z-axial direction, thereby relatively broadening the gap between the power feedback portion 101 and the fixing portion 103.

The controller 105 may include the upper controller 105-1, and the lower controller 105-2. Here, although the upper controller 105-1 and the lower controller 105-2 may be included in an internal portion of the fixing portion 103 and an internal portion of the power feedback portion 101, respectively, positions of the power feedback portion 101 and the fixing portion 103 may not be limited thereto. The power feedback portion 101 and the fixing portion 103 may be disposed in an external portion to perform control.

The upper controller 105-1 may determine the press depth to which the second contact portion may be pressed by the p pressing actuators, based on the gap adjusted by the fixing portion 103. In this instance, the upper controller 105-1 may determine the press depth to which the second contact portion may be pressed by the p pressing actuators, based on the input signal associated with the thickness of the object. Here, the upper controller 105-1 may determine the press depth of the second contact portion, by receiving an input of the input signal before an input of the sensed signal is received by the lower controller 105-2. That is, the upper controller 105-1 may determine the press depth of the second contact portion before the power feedback portion 101 is moved based on the sensed signal, thereby adjusting the gap between the power feedback portion 101 and the fixing portion 103 while the power feedback portion 101 is in a default state, that is, while a power is not sensed by the sensor, and the power feedback portion 101 is separated from the fixing portion 103 by a predetermined gap, without being moved in at least one direction.

The lower controller 105-2 may determine the support height by which the first contact portion may be supported by the n first actuators, based on a first sensed signal generated by the sensor, and may determine the movement distance by which the first power feedback portion may be moved by the m second actuators, based on a second sensed signal generated by the sensor.

The fastener 107 may fasten the power feedback portion 101 and the fixing portion 103 while maintaining the adjusted gap between the power feedback portion 101 and the fixing portion 103. That is, the fastener 107 may connect a side of the power feedback portion 101 to a side of the fixing portion 103 so that the adjusted gap may be maintained.

Figure 2B:
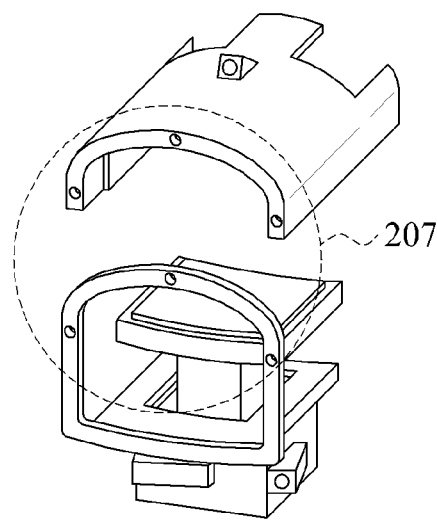

FIGS. 2A and 2B illustrate an example of a contact type tactile feedback apparatus 200 according to example embodiments. Here, FIG. 2A is a perspective view of the contact type tactile feedback apparatus 200, and FIG. 2B is an exploded perspective view of the contact type tactile feedback apparatus 200.

Referring to FIGS. 2A and 2B, the contact type tactile feedback apparatus 200 may include, for example, a power feedback portion 201, and a fixing portion 203.

The power feedback portion 201 may be moved in at least one direction based on a sensed signal generated by a sensor (not shown), thereby transferring a power to an object in contact with the power feedback portion 201. Here, the power feedback portion 201 may include a first power feedback portion 201-1 associated with a power in a vertical direction, and a second power feedback portion 201-2 associated with a power in a horizontal direction.

The fixing portion 203 disposed on an upper portion of the power feedback portion 201 may be partially connected to the power feedback portion 201 through the fastener 207, and may adjust a gap between the power feedback portion 201 and the fixing portion 203 such that the object may be in close contact with the power feedback portion 201.

Figure 3A:
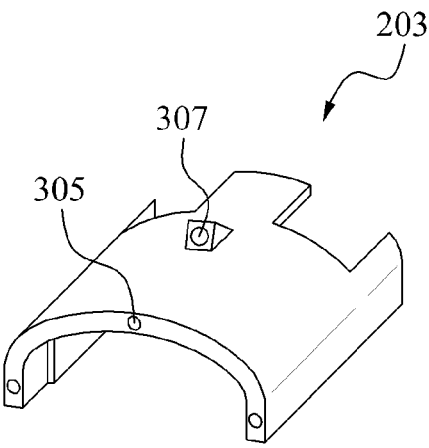
FIGS. 3A through 3C illustrate a fixing portion in the contact type tactile feedback apparatus of FIGS. 2A and 2B.
Figure 3B:
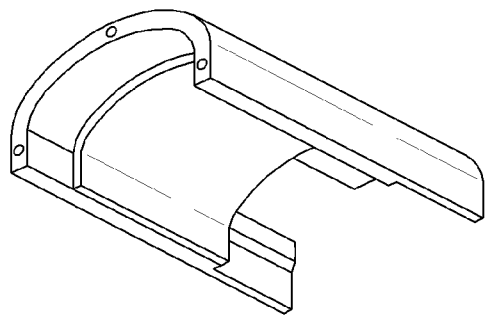
Figure 3C:
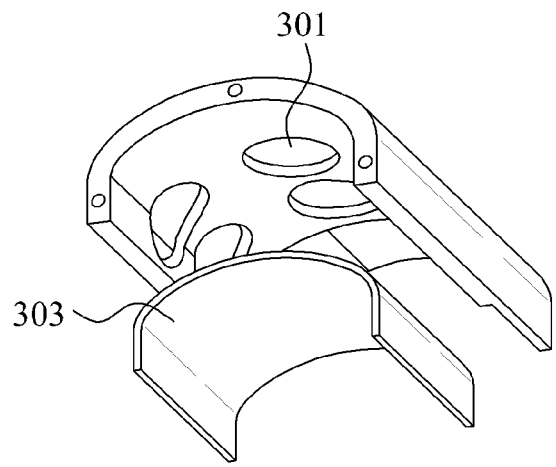

FIGS. 3A through 3C illustrate the fixing portion 203 in the contact type tactile feedback apparatus 200 of FIGS. 2A and 2B.

Referring to FIGS. 3A through 3C, the fixing portion 203 may include a plurality of pneumatic chambers 301 that are disposed on a lower portion of a fixed frame, for example, an arched frame, and a second contact portion 303. Also, the fixing portion 203 may further include a first fastener 305, for example a screw hole, disposed in the fixed frame, to fasten the fixing portion 203 to the power feedback portion 201 of FIGS. 2A and 2B.

The pneumatic chamber 301 may inflate in a lower direction in proportion to an amount of air inserted by a pressing actuator, for example, through an air inlet 307 disposed in an external portion of the fixed frame.

The second contact portion 303 disposed to be attached to a lower layer of the pneumatic chamber 301 may be formed of, for example, an elastic member, and may be moved conjunctively in response to a change in a size of the pneumatic chamber 301. Here, when the second contact portion 303 moves in the lower direction in response to the change in the size of the pneumatic chamber 301, the second contact portion 303 may press an upper surface of an object in contact with the power feedback portion 201 such that the object may be in close contact with the power feedback portion 201.

Figure 4A:
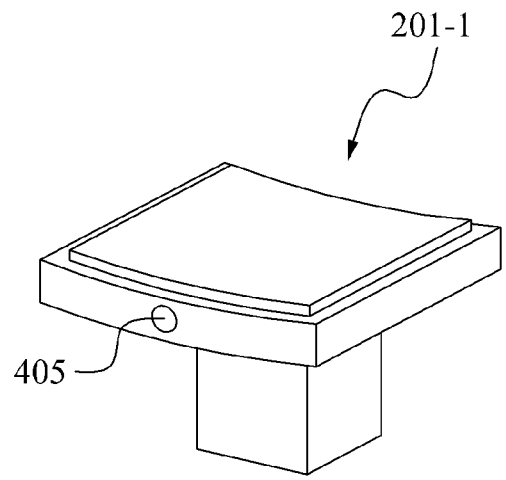
FIGS. 4A through 4C illustrate a first power feedback portion in the contact type tactile feedback apparatus of FIGS. 2A and 2B.
Figure 4B:
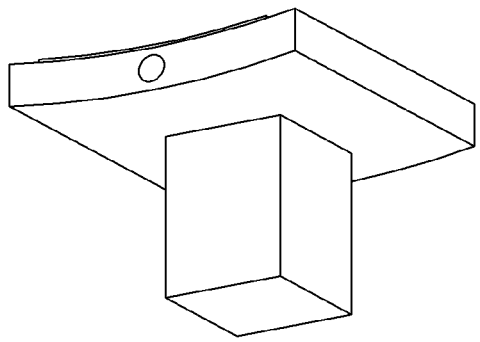
Figure 4C:
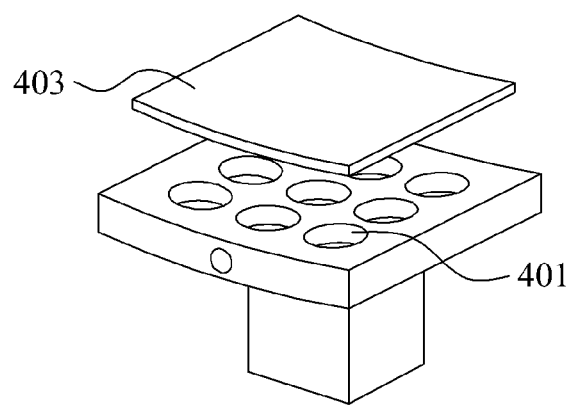

FIGS. 4A through 4C illustrate the first power feedback portion 201-1 in the contact type tactile feedback apparatus 200 of FIGS. 2A and 2B.

Referring to FIGS. 4A through 4C, the first power feedback portion 201-1 may include a plurality of pneumatic chambers 401 that are disposed on an upper portion of a first power feedback frame, for example, a T-shaped frame, and a first contact portion 403.

The pneumatic chamber 401 may inflate in an upper direction in proportion to an amount of air inserted by a first actuator, for example, through an air inlet 405 disposed in a side of the first power feedback frame.

The first contact portion 403 disposed to be attached to an upper layer of the pneumatic chamber 401 may be formed of, for example, an elastic member, and may be moved conjunctively in response to a change in a size of the pneumatic chamber 401. Here, when the first contact portion 403 inflates in the upper direction in response to the change in the size of the pneumatic chamber 401, the first contact portion 403 may transfer a power to the object in an upward vertical direction. Also, when a level of the inflation of the first contact portion 403 is reduced in response to the change in the size of the pneumatic chamber 401, the first contact portion 403 may transfer the power to the object in a downward vertical direction.

Figure 5A:
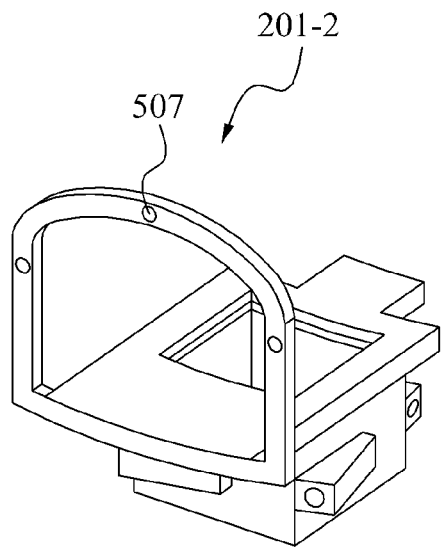
FIGS. 5A through 5C illustrate a second power feedback portion in the contact type tactile feedback apparatus of FIGS. 2A and 2B.
Figure 5B:
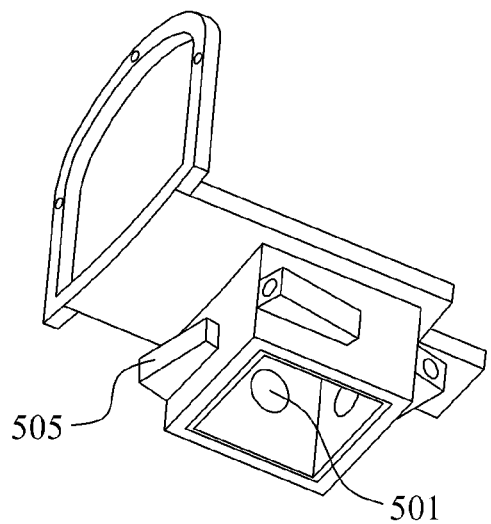
Figure 5C:
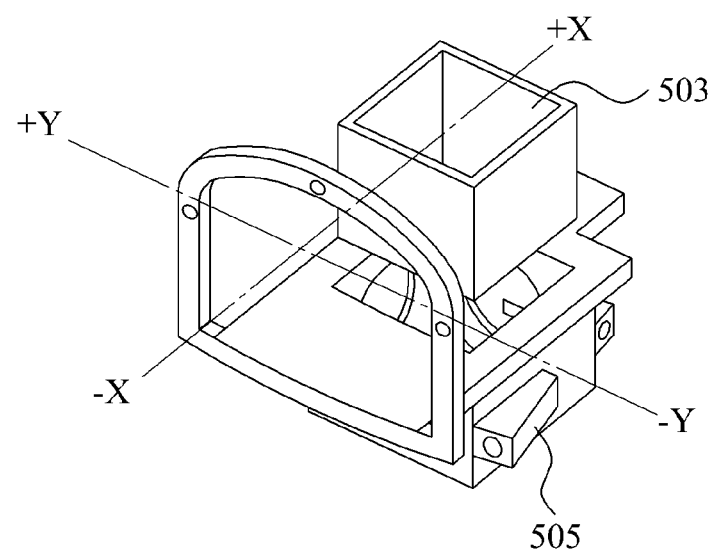

FIGS. 5A through 5C illustrate the second power feedback portion 201-2 in the contact type tactile feedback apparatus 200 of FIGS. 2A and 2B.

Referring to FIGS. 5A through 5C, the second power feedback portion 201-2 may include a plurality of pneumatic chambers 501 that are disposed on an internal side of a second power feedback frame, and a movement feedback portion 503. Also, the second power feedback portion 201-2 may further include a second fastener 507, for example a screw hole, to fasten the second power feedback portion 201-2 to the fixing portion 203 of FIGS. 2A and 2B.

The pneumatic chamber 501 may inflate in a left or right direction in proportion to an amount of air inserted by a first actuator, for example, through a plurality of air inlets 505 disposed in external sides of the second power feedback frame.

The movement feedback portion 503 disposed to be attached to a side of the pneumatic chamber 501 may be formed of, for example, an elastic member, and may be moved conjunctively in response to a change in a size of the pneumatic chamber 501. For example, when the movement feedback portion 503 inflates in a lateral direction in response to the change in the size of the pneumatic chamber 501, the movement feedback portion 503 may move the first power feedback portion 201-1 of FIGS. 2A and 2B, received in the second power feedback portion 201-2, in a left or right direction depending on a position of an inflating pneumatic chamber, thereby transferring the power to the object in contact with the first power feedback portion 201-1 in a horizontal direction.

Figure 6A:
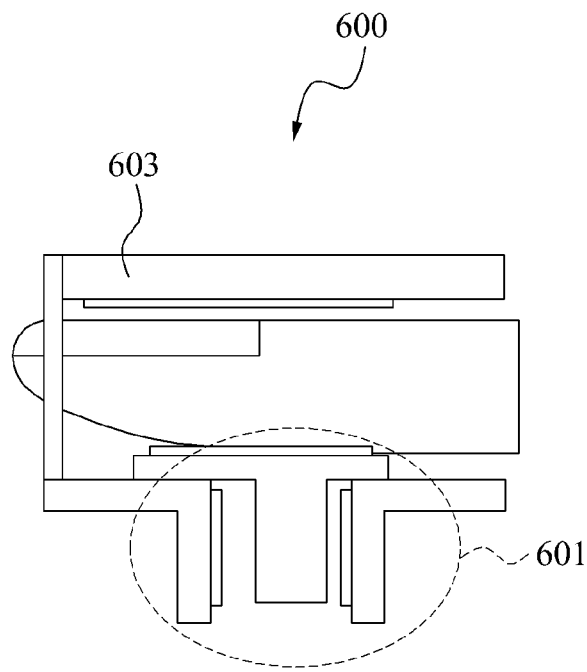
FIGS. 6A and 6B illustrate an operation of fixing an object being inserted in the contact type tactile feedback apparatus of FIGS. 2A and 2B.
Figure 6B:
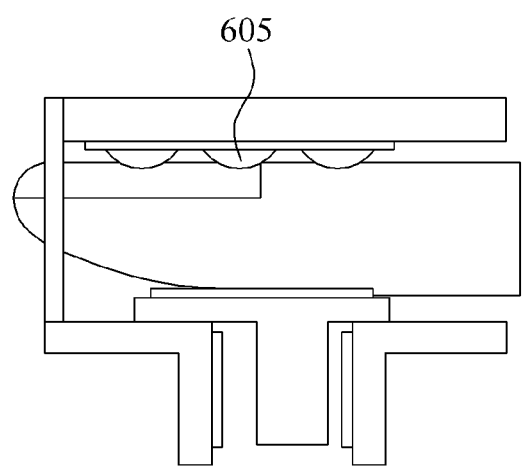

FIGS. 6A and 6B illustrate an operation of fixing of an object being inserted in the contact type tactile feedback apparatus 200 of FIGS. 2A and 2B.

Referring to FIGS. 6A and 6B, when the object is inserted while a power feedback portion 601 and a fixing portion 603 are in a default state, that is, while the power feedback portion 601 and the fixing portion 603 are separated from each other by a predetermined gap since an input signal and a sensed signal are not input, a contact type tactile feedback apparatus 600 may adjust the gap between the power feedback portion 601 and the fixing portion 603 such that the object may be in close contact with the power feedback portion 601. Here, the input signal may refer to a signal to determine the gap between the power feedback portion 601 and the fixing portion 603, in proportion to a thickness of the object.

In this instance, the contact type tactile feedback apparatus 600 may adjust the gap between the power feedback portion 601 and the fixing portion 603 in proportion to an input signal such that the object may be in close contact with the power feedback portion 601. For example, the contact type tactile feedback apparatus may enable a second contact portion 605 in the fixing portion 603 to inflate in a lower direction, based on a press depth determined based on the input signal, thereby pressing an upper surface of the object in contact with the power feedback portion 601 such that the object may be in close contact with the power feedback portion 601.

Figure 7A:
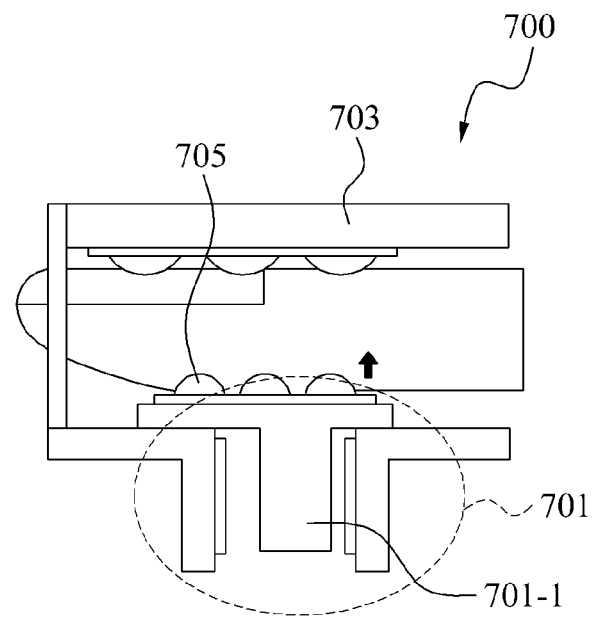
FIGS. 7A and 7B illustrate an operation of transferring a power, in a vertical direction, to an object being inserted in the contact type tactile feedback apparatus of FIGS. 2A and 2B.
Figure 7B:
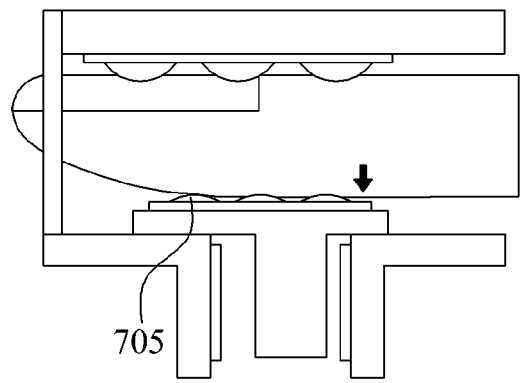

FIGS. 7A and 7B illustrate an operation of transferring a power, in a vertical direction, to an object being inserted in the contact type tactile feedback apparatus 200 of FIGS. 2A and 2B.

Referring to FIGS. 7A and 7B, a contact type tactile feedback apparatus 700 may transfer a power generated by a sensor (not shown) from a power feedback portion 701 to the object, while the object is in close contact with the power feedback portion 701 through a control of a fixing portion 703.

That is, the contact type tactile feedback apparatus 700 may move a first power feedback portion 701-1, thereby transferring the power to the object in a vertical direction.

For example, as shown in FIG. 7A, the contact type tactile feedback apparatus 700 may enable a first contact portion 705 in the first power feedback portion 701-1 to inflate in an upper direction, based on a support height determined based on a first sensed signal generated by the sensor, thereby transferring the power to the object in contact with the first power feedback portion 701-1 in an upward vertical direction. In addition, as shown in FIG. 7B, the contact type tactile feedback apparatus 700 may control a level of the inflation of the first contact portion 705 to be relatively low, based on the support height determined based on the first sensed signal generated by the sensor, thereby transferring the power to the object in contact with the first power feedback portion 701-1 in a downward vertical direction.

Figure 8A:
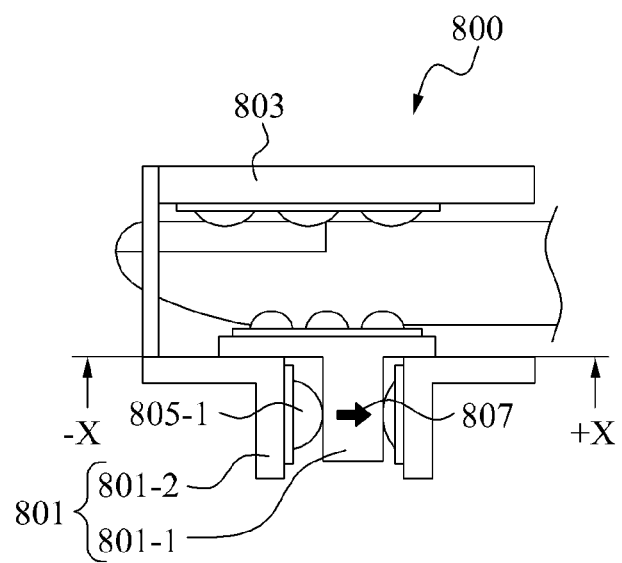
FIGS. 8A through 8D illustrate an operation of transferring a power, in a horizontal direction, to an object being inserted in the contact type tactile feedback apparatus of FIGS. 2A and 2B.
Figure 8B:
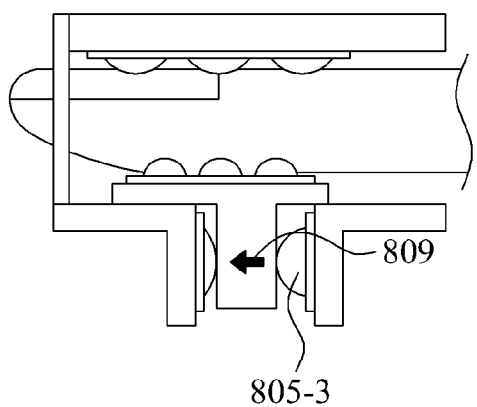
Figure 8C:
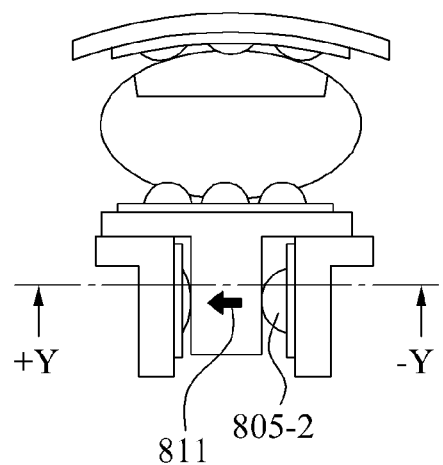
Figure 8D:
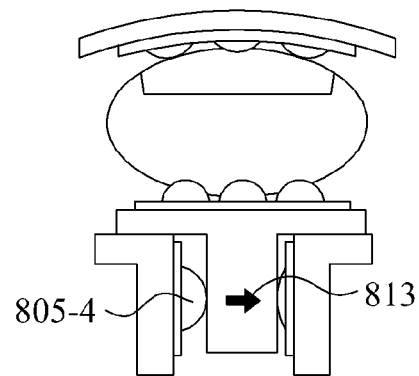

FIGS. 8A through 8D illustrate an operation of transferring a power, in a horizontal direction, to an object being inserted in the contact type tactile feedback apparatus 200 of FIGS. 2A and 2B. Here, FIGS. 8A and 8B are cross-sectional views cut along an X axis of FIG. 5C, and FIGS. 8C and 8D are cross-sectional views cut along a Y axis of FIG. 5C.

Referring to FIGS. 8A through 8D, a contact type tactile feedback apparatus 800 may transfer a power generated by a sensor (not shown) from a power feedback portion 801 to the object, while the object is in close contact with the power feedback portion 801 through a control of a fixing portion 803.

That is, the contact type tactile feedback apparatus 800 may control a second power feedback portion 801-2 to move a first power feedback portion 801-1 received in the second power feedback portion 801-2, thereby transferring the power to the object in contact with the first power feedback portion 801-1 in a horizontal direction. Here, the second power feedback portion 801-2 may include a movement feedback portion that may be disposed on an internal side of a second power feedback frame. The movement feedback portion may include a first movement feedback portion 805-1, a second movement feedback portion 805-2, a third movement feedback portion 805-3, and a fourth movement feedback portion 805-4 that are disposed on sides of the square column, respectively.

For example, as shown in FIG. 8A, the contact type tactile feedback apparatus 800 may enable the first movement feedback portion 805-1 in the second power feedback portion 801-2 to inflate, for example, in a right direction 807, based on a movement distance determined based on a second sensed signal generated by the sensor, to move the first power feedback portion 801-1 received in the second power feedback portion 801-2 in the right direction 807, thereby transferring the power to the object in contact with the first power feedback portion 801-1 in a horizontal direction, for example, a +X-axial direction.

As shown in FIG. 8B, the contact type tactile feedback apparatus 800 may enable the third movement feedback portion 805-3 in the second power feedback portion 801-2 to inflate, for example, in a left direction 809, based on the movement distance determined based on the second sensed signal generated by the sensor, to move the first power feedback portion 801-1 received in the second power feedback portion 801-2 in the left direction 809, thereby transferring the power to the object in contact with the first power feedback portion 801-1 in a horizontal direction, for example, a −X-axial direction.

As shown in FIG. 8C, the contact type tactile feedback apparatus 800 may enable the second movement feedback portion 805-2 in the second power feedback portion 801-2 to inflate, for example, in a left direction 811, based on the movement distance determined based on the second sensed signal generated by the sensor, to move the first power feedback portion 801-1 received in the second power feedback portion 801-2 in the left direction 811, thereby transferring the power to the object in contact with the first power feedback portion 801-1 in a horizontal direction, for example, a +Y-axial direction.

In addition, as shown in FIG. 8D, the contact type tactile feedback apparatus 800 may enable the fourth movement feedback portion 805-4 in the second power feedback portion 801-2 to inflate, for example, in a right direction 813, based on the movement distance determined based on the second sensed signal generated by the sensor, to move the first power feedback portion 801-1 received in the second power feedback portion 801-2 in the right direction 813, thereby transferring the power to the object in contact with the first power feedback portion 801-1 in a horizontal direction, for example, a −Y-axial direction.

Figure 9:
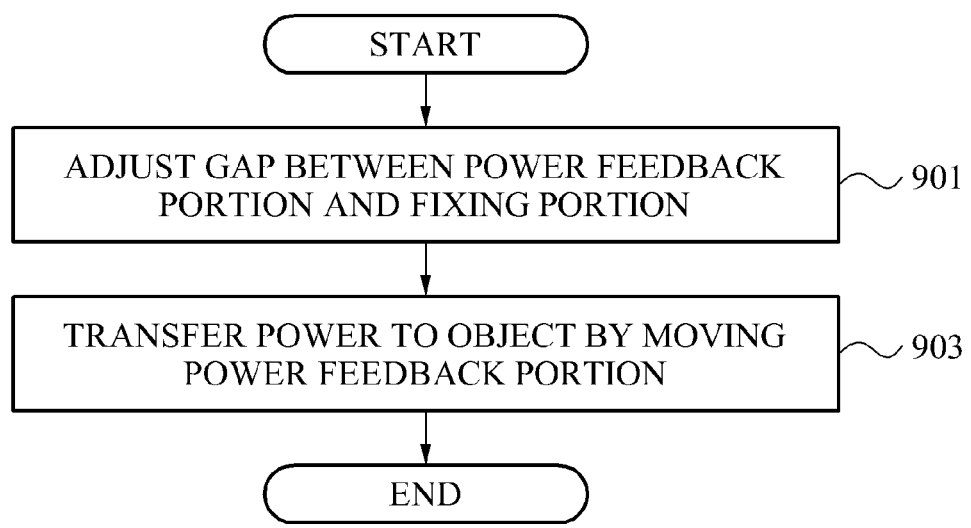
FIG. 9 illustrates an operating method of a contact type tactile feedback apparatus according to example embodiments.

FIG. 9 illustrates an operating method of a contact type tactile feedback apparatus according to example embodiments.

The operating method of the contact type tactile feedback apparatus may be performed when an object, for example, a finger of a user, is in contact with a power feedback portion. In this instance, the object may be inserted between the power feedback portion and a fixing portion connected to the power feedback portion while a predetermined gap between the power feedback portion and the fixing portion is maintained, such that the object may be in contact with the power feedback portion disposed in a lower portion of the fixing portion.

Referring to FIG. 9, in operation 901, the contact type tactile feedback apparatus may adjust the gap between the power feedback portion and the fixing portion such that the object may be in close contact with the power feedback portion. In this instance, the contact type tactile feedback apparatus may adjust the gap between the power feedback portion and the fixing portion, in proportion with an input signal associated with a thickness of the object. In particular, the contact type tactile feedback apparatus may adjust the gap between the power feedback portion and the fixing portion, by pressing, in a lower direction, a second contact portion in the fixing portion in contact with an upper surface of the object, based on a press depth determined based on the input signal.

The contact type tactile feedback apparatus may maintain the adjusted gap between the power feedback portion and the fixing portion such that the object may be in close contact or may remain in close contact with the power feedback portion. That is, the contact type tactile feedback apparatus may fasten the power feedback portion and the fixing portion, thereby enabling the adjusted gap between the power feedback portion and the fixing portion to be maintained.

In operation 903, the contact type tactile feedback apparatus may move the power feedback portion in at least one direction, based on a sensed signal generated by a sensor, thereby transferring a power sensed by the sensor to the object in contact with the power feedback portion.

In particular, the contact type tactile feedback apparatus may move the power feedback portion in a Z-axial direction, based on a first sensed signal generated by the sensor. In particular, the contact type tactile feedback apparatus may move, in the Z-axial direction, a first power feedback portion in the power feedback portion in contact with the object, using a first actuator disposed in the first power feedback portion in the power feedback portion, based on a support height determined based on the first sensed signal, thereby transferring the power to the object in a vertical direction.

In addition, the contact type tactile feedback apparatus may move the power feedback portion in an X-axial direction or a Y-axial direction, based on a second sensed signal generated by the sensor. In particular, the contact type tactile feedback apparatus may move, in the X-axial direction or the Y-axial direction, the first power feedback portion received in a second power feedback portion, using a second actuator disposed in the second power feedback portion in the power feedback portion, based on a movement distance determined based on the second sensed signal, thereby transferring the power to the object in contact with the first power feedback portion in a horizontal direction.

That is, the contact type tactile feedback apparatus may express the power sensed by the sensor as a 3D physical movement while the object is in close contact with the power feedback portion, thereby enabling the object in contact with the power feedback portion to recognize the power intuitively.

The methods according to the above-described embodiments may be recorded in non-transitory computer-readable media including program instructions to implement various operations embodied by a computer. The media may also include, alone or in combination with the program instructions, data files, data structures, and the like. Examples of the non-transitory computer-readable recording medium include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any one or more of the software modules described herein may be executed by a controller such as a dedicated processor unique to that unit or by a processor common to one or more of the modules. The described methods may be executed on a general purpose computer or processor or may be executed on a particular machine such as the contact type tactile feedback apparatus described herein.

According to example embodiments, a contact type tactile feedback apparatus may express a power sensed by a sensor as a 3D physical movement, using a power feedback portion that may be moved in at least one direction based on a sensed signal, thereby readily transferring the power to an object, for example a finger of a user, in contact with the power feedback portion.

According to example embodiments, a contact type tactile feedback apparatus may enable an object to be in close contact with a power feedback portion using a fixing portion to adjust a gap between the power feedback portion and the fixing portion, thereby enabling the object to recognize a power sensed by a sensor more intuitively.

According to example embodiments, a contact type tactile feedback apparatus may be applied to a robot, for example a surgical robot, for controlling an object or a sensitive tissue, for example, a human body, to transfer, to a user, a power sensed when a robot terminal is in contact with the tissue, thereby enabling collaborative control of a power based on the transferred power, and improving efficiency and safety of a task performed using a robot.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A contact type tactile feedback apparatus, comprising:
a power feedback portion to be moved in a first direction based on a sensed signal generated by a sensor; and
a fixing portion to adjust a gap between the power feedback portion and the fixing portion whereby a distance between an object and the power feedback portion is adjusted due to the movement of the power feedback portion.

2. The apparatus of claim 1, wherein the power feedback portion comprises:
a first power feedback portion comprising n first actuators to support, from a lower portion, a first contact portion that is in contact with an upper surface of the object; and
a second power feedback portion to receive the first power feedback portion, the second power feedback portion comprising m second actuators to move the first power feedback portion, in a second direction that is different than the first direction, from a side of the first power feedback portion, wherein n and m denote natural numbers.

3. The apparatus of claim 2, wherein the power feedback portion further comprises:
a lower controller to determine a support height at which the first contact portion is supported by the n first actuators, based on a first sensed signal generated by the sensor, and to determine a movement distance by which the first power feedback portion is moved by the m second actuators, based on a second sensed signal generated by the sensor.

4. The apparatus of claim 2, wherein
the first direction is a Z-axial direction and the power feedback portion is moved in the Z-axial direction based on a support height at which the n first actuators support the first contact portion, and
the second direction is an X-axial direction or a Y-axial direction and the power feedback portion moves the first power feedback portion in the X-axial direction or the Y-axial direction based on a movement distance by which the m second actuators move the first power feedback portion.

5. The apparatus of claim 2, wherein the first contact portion is moved by way of an inflow or outflow of air into a pneumatic chamber included in a first actuator.

6. The apparatus of claim 2, wherein the first actuator and the second actuator each comprise a pneumatic balloon actuator, and may each adjust a support height of the first contact portion and a movement distance of the first power feedback portion, respectively, using air pressure.

7. The apparatus of claim 1, wherein the fixing portion comprises:
p pressing actuators to press, in a second direction that is different than the first direction, a second contact portion that is in contact with an upper surface of the object,
wherein p denotes a natural number.

8. The apparatus of claim 7, wherein the fixing portion further comprises:
an upper controller to determine a press depth to which the second contact portion is pressed by the p pressing actuators, based on the adjusted gap.

9. The apparatus of claim 1, further comprising:
a fastener to fasten the power feedback portion and the fixing portion while maintaining the adjusted gap.

10. The apparatus of claim 1, wherein the first direction is substantially orthogonal to the second direction.

11. The apparatus of claim 1, wherein the fixing portion comprises a plurality of pneumatic chamber that are disposed on a lower portion of a fixed frame.

12. An operating method of a contact type tactile feedback apparatus communicating with a sensor, the method comprising:
moving a power feedback portion of the contact type tactile feedback apparatus in a first direction based on a sensed signal generated by the sensor; and
adjusting a gap between the power feedback portion and a fixing portion of the contact type tactile feedback apparatus whereby a distance between an object and the power feedback portion is adjusted due to the movement of the power feedback portion.

13. The method of claim 12, wherein the moving comprises:
moving the power feedback portion in a Z-axial direction based on a first sensed signal generated by the sensor, and
moving the power feedback portion in an X-axial direction or a Y-axial direction, based on a second sensed signal generated by the sensor.

14. The method of claim 12, further comprising:
maintaining the adjusted gap between the power feedback portion and the fixing portion.

15. The method of claim 12, wherein the maintaining of the adjusted gap between the power feedback portion and the fixing portion is performed pneumatically.

16. At least one non-transitory medium comprising computer readable code to control at least one processor to implement the method of claim 12.

17. A contact type tactile feedback apparatus, comprising:
a power feedback portion to be moved in a first direction based on a sensed signal generated by a sensor, the power feedback portion comprising:
a first power feedback portion comprising a first contact portion to contact an upper surface of an object; and
a second power feedback portion to receive the first power feedback portion and to move the first power feedback portion in a second direction that is different than the first direction; and
a fixing portion fastened to the power feedback portion, wherein the fixing portion is configured to adjust a distance between the object and the power feedback portion by adjusting a gap between the power feedback portion and the fixing portion.

18. The apparatus of claim 17, wherein the second direction is substantially orthogonal to the first direction.

19. The apparatus of claim 17, wherein the fixing portion comprises a second contact portion that is configured to contact an upper surface of the object and wherein the first contact portion is configured to contact a lower surface of the object.

* * * * *